US012748535B2

(12) United States Patent
Singh et al.

(10) Patent No.: US 12,748,535 B2
(45) Date of Patent: Sep. 29, 2026

(54) COMPRESSED AND SECURE DRAM DATA STORAGE WITH REDUCED READ-MODIFY-WRITE OPERATIONS

(71) Applicant: QUALCOMM Incorporated, San Diego, CA (US)

(72) Inventors: Vishal Singh, Bangalore (IN); Sonu Kumar Shubham, Madhubani (IN); Pransu Pramod Kumar Shrivastav, Thane (IN); Vasantha Kumar Bandur Puttappa, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 66 days.

(21) Appl. No.: 19/012,070

(22) Filed: Jan. 7, 2025

(65) Prior Publication Data

US 2026/0195055 A1 Jul. 9, 2026

(51) Int. Cl.
*G06F 3/00* (2006.01)
*G06F 3/06* (2006.01)

(52) U.S. Cl.
CPC .......... *G06F 3/0623* (2013.01); *G06F 3/0659* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 11,288,188 B1 | 3/2022 | Tummala et al. | |
| 2013/0198485 A1 | 8/2013 | Nystad et al. | |
| 2019/0238833 A1* | 8/2019 | Jun | H04N 19/124 |
| 2021/0117090 A1* | 4/2021 | Zhang | G06F 3/0608 |

FOREIGN PATENT DOCUMENTS

| | | |
|---|---|---|
| CN | 114341813 A | 4/2022 |
| JP | 2007272551 A | 10/2007 |
| WO | 2022159184 | 7/2022 |

OTHER PUBLICATIONS

International Search Report and Written Opinion—PCT/US2025/059409—ISAEPO—Mar. 18, 2026.

* cited by examiner

*Primary Examiner* — Midys Rojas
(74) *Attorney, Agent, or Firm* — Gerald P. Joyce, III

(57) ABSTRACT

A system is provided that includes a compression engine, a metadata processor, and a memory having a burst length. The compression engine compresses source data according to a compression ratio to form compressed data. The metadata processor processes the compressed data to form metadata having a size that is smaller than the burst length. The metadata processor generates autofill data responsive to the compression ratio and concatenates the autofill data with the metadata to form a metadata burst having a same size as the burst length. A memory controller may then write the metadata burst to the memory without triggering a read-modify-write operation.

20 Claims, 3 Drawing Sheets

COMPRESSED AND SECURE DRAM DATA STORAGE WITH REDUCED READ-MODIFY-WRITE OPERATIONS

TECHNICAL FIELD

The present application relates generally to a secure data storage in DRAM and more particularly to a compressed secure data storage in DRAM with reduced read-modify-write operations.

BACKGROUND

A dynamic random-access memory (DRAM) such as a double data rate (DDR) DRAM has a burst length that indicates how many bytes will be written to or read from the DDR DRAM in a corresponding read or write operation. For example, low-power DDR4 (LPDDR4) or DDR5 (LPDDR5) typically has a burst length of either thirty-two or sixty-four bytes. Regardless of the number of bytes, the burst length sets a limit as to how much data may be written to the DRAM in a single write operation. The burst length may trigger undesirable read-write-modify operations in the writing to the DRAM of metadata generated from a further processing of the compressed data such as to enhance data security.

SUMMARY

In accordance with an aspect of the disclosure, a method of writing to a memory having a burst length is provided that includes: compressing source data in a compression engine according to a compression ratio to form compressed data; transmitting the compressed data and the compression ratio from the compression engine to a metadata processor; processing the compressed data in the metadata processor to form metadata, wherein the metadata has a size smaller than the burst length; generating autofill data in the metadata processor responsive to the compression ratio; concatenating the metadata and the autofill data to form a metadata burst having a same size as the burst length; and writing the metadata burst to the memory.

In accordance with another aspect of the disclosure, a computer system is provided that includes: a memory having a burst length; a compression engine configured to compress source data according to a compression ratio to form compressed data; a metadata processor configured to process the compressed data in the metadata processor to form metadata, wherein the metadata has a size smaller than the burst length, generate autofill data responsive to the compression ratio, and concatenate the metadata and the autofill data to form a metadata burst having a same size as the burst length; and a memory controller configured to write the metadata burst to the memory.

Finally, in accordance with yet another aspect of the disclosure, a computer-readable medium is provided that includes instructions that when executed by a computing system cause the computing system to: compress source data in a compression engine according to a compression ratio to form compressed data; process the compressed data to form metadata, wherein the metadata has a size smaller than a burst length of a memory; generate autofill data responsive to the compression ratio; concatenate the metadata and the autofill data to form a metadata burst having a same size as the burst length; and write the metadata burst to the memory.

These and other advantageous features may be better appreciated through the following detailed description.

BRIEF DESCRIPTION OF THE DRAWINGS

Implementations of the present disclosure and their advantages are best understood by referring to the detailed description that follows. It should be appreciated that like reference numerals are used to identify like elements illustrated in one or more of the figures.

DETAILED DESCRIPTION

Figure 1:
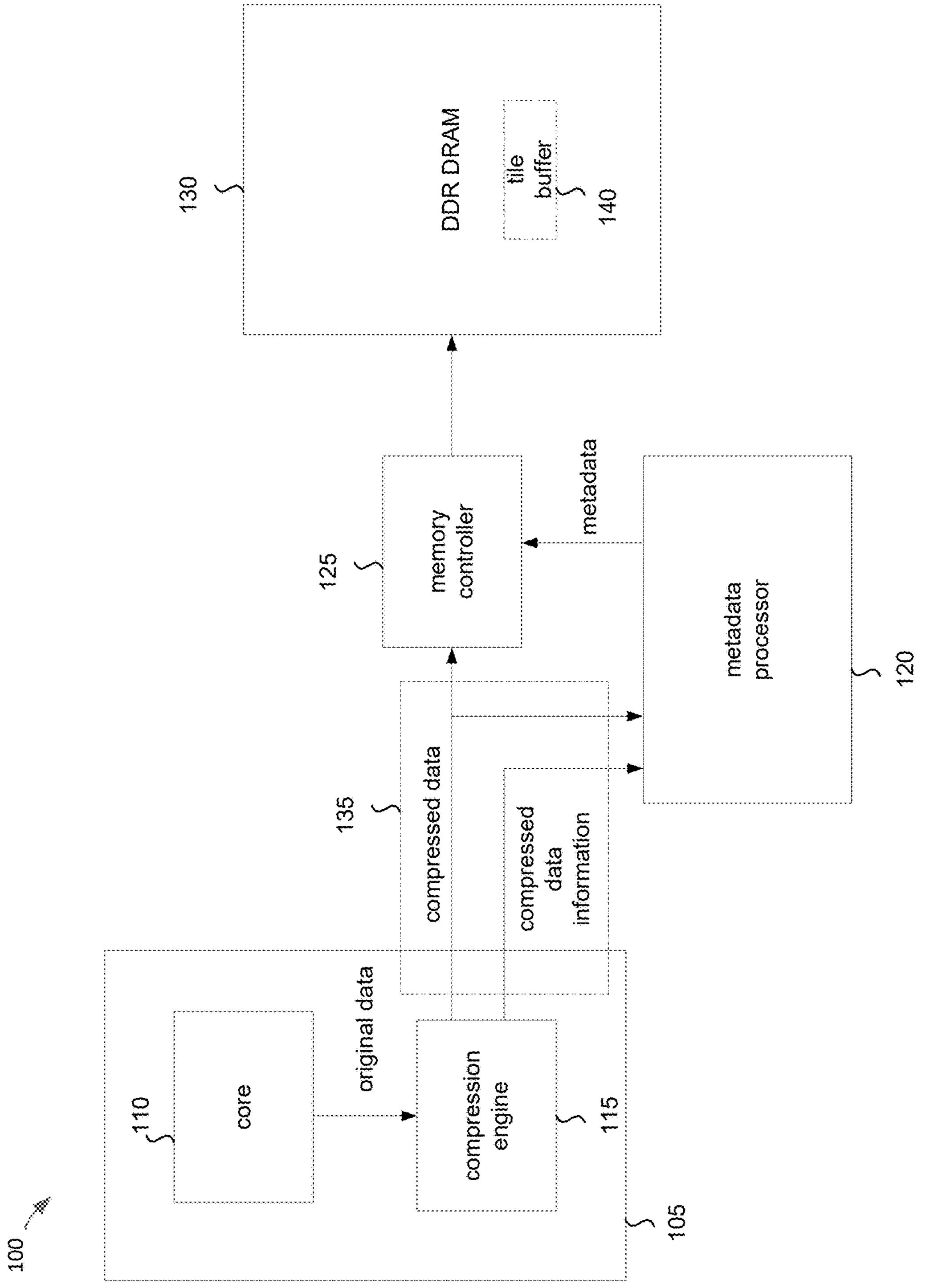
FIG. 1 illustrates a system configured to generate metadata for compressed data and write the metadata to a memory without triggering a read-modify-write operation in accordance with an aspect of the disclosure.

The combination of data compression and data security with respect to DRAM write operations typically generates undesirable read-modify-write operations. To provide a better appreciation of this issue, data compression and data security will first be briefly reviewed. With respect to data compression, a data source such as a graphics processing unit (GPU) applies a certain amount of compression on a block of original (uncompressed) data that depends upon the codec applied by the GPU. One example codec compresses an original 256-byte block of pixels into a 64-byte block. With respect to data security, a metadata processor will apply a security primitive to the compressed data that generates security metadata in conjunction with a security processing of the data. The resulting compressed data and its security metadata may then be written to a DDR DRAM. The amount of security metadata that is generated with respect to a given amount of data to be secured depends on the security primitive used by the metadata processor. For example, the ratio of data to security metadata in a DRAM Authentication and Encryption (DAE) metadata processor may vary from one-to-one (no compression applied) to eight-to-one or even higher such as sixteen-to-one or thirty-two-to-one depending upon operating conditions. Note that these ratios are independent of the data compression.

Suppose that the source data being secured by a metadata processor was compressed using the codec discussed earlier and that the ratio of compressed data to metadata was eight-to-one. The metadata processor would then generate eight bytes of security data from the 64-byte of compressed data from the GPU. But since the DDR DRAM burst length is 32 bytes, a memory controller cannot simply write the eight bytes of security metadata to the DDR DRAM but must instead perform a read-modify-write operation. The eight bytes of security data were to be written to an address in the DDR DRAM. With respect to a read portion of the read-modify-write operation, the metadata processor then reads a 32-byte burst of data from the DDR DRAM at the address. In a modify portion of the read-modify-write operation, the metadata processor replaces eight bytes of the 32-byte burst of data with the metadata to form a modified 32-byte burst of data. Finally, in a write portion of the read-modify-write operation, the modified 32-byte burst of data is then written to the DDR DRAM at the corresponding address. More generally, a read-modify-write operation will be triggered by a metadata processor when a metadata size generated from processing a block of compressed data does not match the burst length of the DDR DRAM. The resulting read-modify-write operations degrade the performance improvement that would otherwise be gained from the data compression. Note that this problem will exist so long as metadata is generated from compressed data, regardless of whether the metadata is security metadata or is some other type of metadata.

To address the performance degradation that occurs from writing of metadata generated from compressed data to a memory having a burst length that does not match a size of the metadata, a data compression engine is disclosed that generates compression information with the compressed data. A metadata processor may then use the compression information to identify whether the resulting metadata will not occupy the entire burst length to the DDR DRAM. Should the metadata size be less than the burst length, the metadata processor auto-fills the unused bytes with don't care data (either binary zeroes, binary ones, or any combination of the two) as will be explained further herein. Since the entire metadata burst is then filled, the metadata processor may then proceed to write the metadata burst to the DDR DRAM without needing a read-modify-write operation. The performance advantages of data compression may then be advantageously retained despite the generation of metadata from the compressed data.

An example system 100 is shown in FIG. 1. System 100 may be included in a single integrated circuit system-on-a-chip or instead may be formed using chiplets or chipset-based architectures. A data source 105 may be a GPU, a camera, or any other data source that generates original (uncompressed) data in a core 110 and then performs data compression on the original data using a compression engine 115 to form compressed data. A metadata processor 120 applies a data security algorithm on the compressed data to generate security metadata. Example data security algorithms or protocols that may be used in the metadata processor 120 includes DRAM encryption and authentication (DAE), memory tagging and extension (MTE), and DRAM authentication replay-protection and encryption (DARE) but it will be appreciated that the metadata processor 120 may apply any algorithm or procedure that generates metadata such that the metadata is not limited to security metadata. In some implementations, metadata processor 120 may be a last-level cache processor.

A memory controller 125 writes the compressed data and the metadata to a DRAM such as a DDR DRAM 130. More generally, DRAM 130 may be a synchronous DRAM as the advantageous suppression of read-modify-write operations is not dependent on whether a double data rate is used. For brevity, DDR DRAM 130 will also be denoted as a DDR 130 in the following discussion. The writes of the compressed data and the metadata by the memory controller 125 to the DDR 130 occurs according to a burst length that is typically defined as a multiple of bytes. In the following discussion, it will be assumed that the burst length is thirty-two bytes, but it will be appreciated that the burst length may be smaller or larger than thirty-two bytes in alternate implementations.

Referring again to the compression engine 115, its data compression in defined with respect to a block of the original data that is denoted herein as a tile. The tile size is arbitrary, but it will be assumed to be 256 bytes in the following discussion without loss of generality. The amount of compression from the compression engine 115 is variable. In some modes, there is no compression such that the "compressed data" from the compression engine is unchanged from the original tile. Should no compression be applied, the metadata processor 120 generates metadata for the 256-byte tile. The ratio of metadata to data being processed by the metadata processor 120 depends upon its implementation. Should the metadata processor 120 be a DAE metadata processor, the metadata processor 120 may generate one byte of metadata for every eight bytes of data (a 1:8 ratio) but it will be appreciated that other ratios such as 1:4, 1:6, 1:10, and so on may be used in alternative implementations. Should the compression engine 115 be controlled to apply no compression to a 256-byte tile, the metadata processor 120 will then generate 32 bytes of metadata. Since the 32 bytes equals the burst length of the DDR 130, the memory controller 125 may proceed to write the metadata to the DDR without needing to perform a read-modify-write operation.

But a need for a read-modify-write operation arises for a traditional metadata processor when compression is indeed applied by the compression engine 115. For example, suppose that the compression engine 115 is a universal bandwidth compression (UBWC) engine that that has a variable compression ratio such that the compressed data is compressed in thirty-two-byte increments. Should the increment be 0, no compression is applied. If the increment is one, a 256-byte tile is compressed to 224 bytes, and so on. The resulting compression is summarized in the following Table 1:

| Original Tile Size | Compressed data size | CR_RATIO ((original tile size − tile size after compression)/minimum tile size after compression) |
|---|---|---|
| 256 bytes | 32 bytes | 7 |
| 256 bytes | 64 bytes | 6 |
| 256 bytes | 96 bytes | 5 |
| 256 bytes | 128 bytes | 4 |
| 256 bytes | 160 bytes | 3 |
| 256 bytes | 192 bytes | 2 |
| 256 bytes | 224 bytes | 1 |
| 256 bytes | 256 bytes | 0 |

A variable CR_RATIO is one example of compression information that identifies the compression ratio, where CR_RATIO equals a ratio equaling a difference between the original tile size and the tile size after compression divided by a minimum tile size after compression. For example, if the compressed data size is 224 bytes, the difference between the original tile size and the compressed data size is 32 bytes such that the CR_RATIO is one. Suppose that the CR_RATIO is two. The metadata processor 120 may then determine that the metadata size will be only 24 bytes. Eight bytes of the burst length will thus never be generated in this scenario. But since the metadata processor 120 may determine this from the compression ratio such as identified through the variable CR_RATIO, the metadata processor 120 may proceed to mark the unused eight bytes of data in the metadata burst as valid data by auto-filling these unused bytes with don't care data. The metadata processor 120 thus concatenates the metadata with the autofill data to form a fully-completed metadata burst. The memory controller 125 may then proceed to write the metadata bursts to the DDR 130 without triggering any read-modify-write operations because the memory controller 125 will always receive a full thirty-two bytes for each metadata burst. More generally, the memory controller 125 will always receive a fully-completed metadata burst that depends upon the burst size (in this example, thirty-two bytes) for the DDR 130.

Any suitable protocol may be modified to include the compression information. For example, the write address channel of an Advanced extensible Interface (AXI) bus 135 may be modified to include the compression information. In alternative implementations, the bus 135 may instead be a AXI Coherency Extensions (ACE) bus or a Coherent Hub Interface (CHI) bus. Note that the compression information is not limited to identifying the compression ratio. In some implementations, the position of the compressed data with respect to the original tile may be identified in the compression information. In particular, note that the original tile is written to the DDR 130 if there is no compression. There is thus a tile-sized storage space or tile buffer 140 in the DDR 130 for each compressed data write to the DDR 130. The compressed data has a particular location within this tile-sized buffer 140 that is identified in the compression information through a CR_POS variable. For example, the tile buffer 140 may be divided into chunks or portions such as 64-byte chunks. The tile buffer 140 is also denoted herein as a compressed data buffer. A value of zero for the CR_POS variable could then identify that the compressed data is to be written to the tile buffer 140 starting from the beginning of the first 64-byte chunk. Similarly, a value of one for the CR_POS variable may identify that the compressed data is to be written to the tile buffer 140 starting from the second 64-byte chunk, a value of two may identify that the compressed data begins with the third 64-byte chunk, and a value of three may identify that the compressed data begins with the fourth 64-byte chunk. More generally, the tile buffer 140 may be divided into equal-sized portions with the CR_POS variable identifying which portion has the starting position of the compressed data. Some examples of the CR_POS variable are given in the following Table 2:

| Start Position | CR_POS |
|---|---|
| 1st 64-byte chunk | 0 |
| 2nd 64-byte chunk | 1 |
| 3rd 64-byte chunk | 2 |
| 4th 64-byte chunk | 3 |

In some implementations, the compression information may include also a CR_TYPE variable that identifies the type of traffic for the compressed data such as UBWC data, solid color compression data, or deep learning-based compression data (DLBC). Each type of data traffic for the compressed data may be identified by a corresponding integer in the CR_TYPE variable. Such a variable is useful for the metadata processor to decode the remaining metadata position. The entirety of the compression information is useful not only for the avoidance of read-modify-write operations but also for the metadata processing. For example, the metadata processor 120 may hold a cache line in the system cache (not illustrated) if the compression information identifies a possibility of further coalescing. In addition, a cache line may be replaced if all the data bits are set. Some example values of the CR_TYPE variable are given in the following Table 3:

| Compression Type | CR_TYPE |
|---|---|
| UBWC | 0 |
| Solid Color Compression | 1 |
| DLBC | 2 |

It will be appreciated that the example values for the compression information variables given herein are merely exemplary. Other values and other types of compression information variables may be used in alternative implementations.

Figure 2:
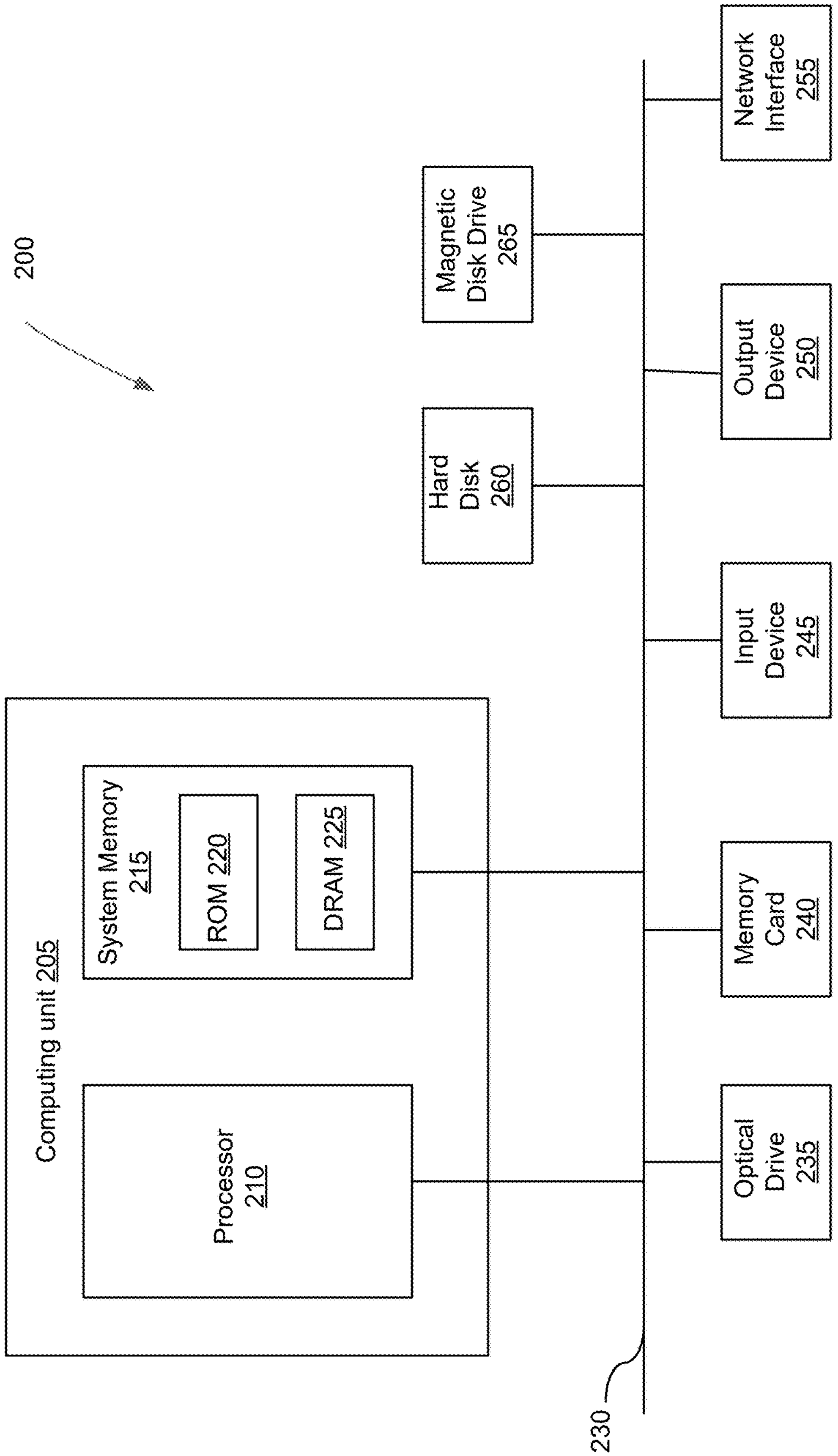
FIG. 2 illustrates a computer system configured to generate metadata for compressed data and write the metadata to a memory without triggering a read-modify-write operation in accordance with an aspect of the disclosure.

An example computing system 200 that may be modified to implement the system 100 is shown in FIG. 2. As seen in this figure, the computing system 200 includes a computing unit 205 with an at least one processor 210 that executes instructions from and stores data in a system memory 215. The at least one processor 210 may be any type of programmable electronic device for executing software instructions but will typically be one or more microprocessors. The system memory 215 may include both a read-only memory (ROM) 220 and a DRAM 225. As will be appreciated by those of ordinary skill in the art, both the read-only memory (ROM) 220 and the DRAM 225 may store software instructions for execution by the at least one processor 210.

The at least one processor 210 and the system memory 215 are connected, either directly or indirectly, through a bus 230 or alternate communication structure, to one or more peripheral devices. For example, the at least one processor 210 or the system memory 215 may be directly or indirectly connected to one or more additional memory storage devices, such as a “hard” magnetic disk drive 260, a removable magnetic disk drive 265, an optical disk drive 235, or a flash memory card 240. The at least one processor 210 and the system memory 215 also may be directly or indirectly connected to one or more input devices 245 and one or more output devices 250. The input devices 245 may include, for example, a keyboard, a pointing device (such as a mouse, touchpad, stylus, trackball, or joystick), a scanner, a camera, and a microphone. The output devices 250 may include, for example, a monitor display, a printer and speakers. With various examples of the computer system 200, one or more of the peripheral devices 235, 240, 245, 260, and 265 may be internally housed within a housing of the computer system 200. Alternately, one or more of the peripheral devices 235, 240, 245, 250, 260, and 265 may be external to the housing and connected to the bus 230 through, for example, a Universal Serial Bus (USB) connection.

With some implementations, the computing system 200 may be directly or indirectly connected to one or more network interfaces 255 for communicating with other devices making up a network. The network interface 255 translates data and control signals from the computer system 200 into network messages according to one or more communication protocols, such as the transmission control protocol (TCP) and the Internet protocol (IP). Also, the interface 255 may employ any suitable connection agent (or combination of agents) for connecting to a network, including, for example, a wireless transceiver, a modem, or an Ethernet connection. Such network interfaces and protocols are well known in the art, and thus will not be discussed here in more detail. It should be appreciated that the computing system 200 is illustrated as an example only, and it not intended to be limiting. Various implementations may be formed using one or more computing systems that include the components of the system 200 illustrated in FIG. 2 or which include only a subset of the components illustrated in FIG. 2, or which include an alternate combination of components, including components that are not shown in FIG. 2.

Figure 3:
FIG. 3 illustrates a process flow for generating metadata for compressed data and writing the metadata to a memory without triggering a read-modify-write operation in accordance with an aspect of the disclosure.

A method of writing metadata generated from compressed data to a memory having a burst length will now be discussed with respect to the flowchart of FIG. 3. The method includes an act 300 of compressing source data in a compression engine according to a compression ratio to form compressed data. The compression of source data in the compression engine 115 is an example of act 300. The method also includes an act 305 of transmitting the compressed data and the compression ratio from the compression engine to a metadata processor. The transmission of the compressed data and the compression information from the compression engine over the interface 135 to the metadata processor 120 is an example of act 305. The method further includes an act 310 of processing the compressed data in the metadata processor to form metadata, wherein the metadata has a size smaller than the burst length. The processing of the compressed data to form metadata by the metadata processor 120 is an example of act 310. The method further includes an act 315 of generating autofill data in the metadata processor responsive to the compression ratio. The generation of the don't care data by the metadata processor 120 is an example of act 315. The method also includes an act 320 of concatenating the metadata and the autofill data to form a metadata burst having a same size as the burst length. The concatenation by the metadata processor 120 is an example of act 320. Finally, the method includes an act 325 of writing the metadata burst to the memory. The writing of the metadata and the don't care values to the DDR 130 is an example of act 325.

Some example implementations will now be summarized through the following numbered clauses;

Clause 1. A method of writing to a memory having a burst length, comprising:
- compressing source data in a compression engine according to a compression ratio to form compressed data;
- transmitting the compressed data and the compression ratio from the compression engine to a metadata processor;
- processing the compressed data in the metadata processor to form metadata, wherein the metadata has a size smaller than the burst length;
- generating autofill data in the metadata processor responsive to the compression ratio;
- concatenating the metadata and the autofill data to form a metadata burst having a same size as the burst length; and
- writing the metadata burst to the memory.

2. The method of clause 1, wherein compressing the source data in the compression engine comprises compressing the source data according to a universal bandwidth compression.

3. The method of clause 1, wherein compressing the source data in the compression engine comprises compressing the source data according to a deep learning-based compression.

4. The method of any of clauses 1-3, wherein processing the compressed data in the metadata processor comprises processing the compressed data in a last-level cache processor.

5. The method of any of clauses 1-4, wherein processing the compressed data in the metadata processor comprises processing the compressed data according to a DRAM authentication and encryption algorithm.

6. The method of any of clauses 1-5, wherein transmitting the compression data and the compression ratio comprises transmitting the compression data and the compression ratio over an Advanced extensible Interface bus.

7. The method of clause 6, wherein transmitting the compression ratio over the Advanced extensible Interface bus comprises transmitting the compression ratio using a write address channel in the Advanced extensible Interface bus.

8. The method of any of clauses 1-7, further comprising:
- transmitting a type variable from the compression engine to the metadata processor, wherein the type variable identifies a compression algorithm used by the compression engine to form the compressed data.

9. The method of any of clauses 1-8, further comprising:
- generating a position variable that identifies a desired position of the compressed data in a compressed data buffer within the memory, wherein the compressed data buffer has a same size as the source data;
- transmitting the position variable from the compression engine to the metadata processor; and
- writing the compressed data the compressed data buffer, wherein the compressed data is positioned within the compressed data buffer responsive to the position variable.

10. A computer system, comprising:
- a memory having a burst length;
- a compression engine configured to compress source data according to a compression ratio to form compressed data;
- a metadata processor configured to process the compressed data in the metadata processor to form metadata, wherein the metadata has a size smaller than the burst length, generate autofill data responsive to the compression ratio, and concatenate the metadata and the autofill data to form a metadata burst having a same size as the burst length; and
- a memory controller configured to write the metadata burst to the memory.

11. The computer system of clause 10, wherein the memory is a double data rate (DDR) dynamic random-access memory (DRAM).

12. The computer system of any of clauses 10-11, wherein the burst length is an integer multiple of bytes.

13. The computer system of any of clauses 10-12, wherein the compression engine is a universal bandwidth compression (UBWC) engine.

14. The computer system of any of clauses 10-13, wherein the metadata processor is a last-level cache processor.

15. The computer system of any of clauses 10-14, further comprising:
- an Advanced extensible Interface bus, wherein the compression engine is further configured to transmit the compressed data and the compression ratio over the Advanced extensible Interface bus to the metadata processor.

16. The computer system of any of clauses 10-15, further comprising:
- a graphics processing unit configured to generate the source data.

17. The computer system of any of clauses 10-16, wherein the compression engine is further configured to generate a type variable that identifies a compression algorithm used to form the compressed data and to transmit the type variable to the metadata processor.

18. The computer system of any of clauses 10-17, wherein the compression engine is further configured to generate a position variable that identifies a desired position of the compressed data within a compressed data buffer in the memory and to transmit the position variable to the metadata processor.

19. The computer system of clause 18, wherein the compressed data buffer has a same size as the source data.

20. A computer-readable medium including instructions that when executed by a computing system cause the computing system to:
 compress source data in a compression engine according to a compression ratio to form compressed data;
 process the compressed data to form metadata, wherein the metadata has a size smaller than a burst length of a memory;
 generate autofill data responsive to the compression ratio;
 concatenate the metadata and the autofill data to form a metadata burst having a same size as the burst length; and
 write the metadata burst to the memory.

As those of some skill in this art will by now appreciate and depending on the particular application at hand, many modifications, substitutions and variations can be made in and to the materials, apparatus, configurations and methods of use of the devices of the present disclosure without departing from the scope thereof as defined by the appended claims. In light of this, the scope of the present disclosure should not be limited to that of the particular implementations illustrated and described herein, as they are merely by way of some examples thereof, but rather, should be fully commensurate with that of the claims appended hereafter and their functional equivalents.

What is claimed is:

1. A method of writing to a memory having a burst length, comprising:
 compressing source data in a compression engine according to a compression ratio to form compressed data;
 transmitting the compressed data and the compression ratio from the compression engine to a metadata processor;
 processing the compressed data in the metadata processor to form metadata, wherein the metadata has a size smaller than the burst length;
 generating autofill data in the metadata processor responsive to the compression ratio;
 concatenating the metadata and the autofill data to form a metadata burst having a same size as the burst length; and
 writing the metadata burst to the memory.

2. The method of claim 1, wherein compressing the source data in the compression engine comprises compressing the source data according to a universal bandwidth compression.

3. The method of claim 1, wherein compressing the source data in the compression engine comprises compressing the source data according to a deep learning-based compression.

4. The method of claim 1, wherein processing the compressed data in the metadata processor comprises processing the compressed data in a last-level cache processor.

5. The method of claim 1, wherein processing the compressed data in the metadata processor comprises processing the compressed data according to a DRAM authentication and encryption algorithm.

6. The method of claim 1, wherein transmitting the compression data and the compression ratio comprises transmitting the compression data and the compression ratio over an Advanced extensible Interface bus.

7. The method of claim 6, wherein transmitting the compression ratio over the Advanced extensible Interface bus comprises transmitting the compression ratio using a write address channel in the Advanced extensible Interface bus.

8. The method of claim 1, further comprising:
 transmitting a type variable from the compression engine to the metadata processor, wherein the type variable identifies a compression algorithm used by the compression engine to form the compressed data.

9. The method of claim 1, further comprising:
 generating a position variable that identifies a desired position of the compressed data in a compressed data buffer within the memory, wherein the compressed data buffer has a same size as the source data;
 transmitting the position variable from the compression engine to the metadata processor; and
 writing the compressed data the compressed data buffer, wherein the compressed data is positioned within the compressed data buffer responsive to the position variable.

10. A computer system, comprising:
 a memory having a burst length;
 a compression engine configured to compress source data according to a compression ratio to form compressed data;
 a metadata processor configured to process the compressed data in the metadata processor to form metadata, wherein the metadata has a size smaller than the burst length, generate autofill data responsive to the compression ratio, and concatenate the metadata and the autofill data to form a metadata burst having a same size as the burst length; and
 a memory controller configured to write the metadata burst to the memory.

11. The computer system of claim 10, wherein the memory is a double data rate (DDR) dynamic random-access memory (DRAM).

12. The computer system of claim 10, wherein the burst length is an integer multiple of bytes.

13. The computer system of claim 10, wherein the compression engine is a universal bandwidth compression (UBWC) engine.

14. The computer system of claim 10, wherein the metadata processor is a last-level cache processor.

15. The computer system of claim 10, further comprising:
 an Advanced extensible Interface bus, wherein the compression engine is further configured to transmit the compressed data and the compression ratio over the Advanced extensible Interface bus to the metadata processor.

16. The computer system of claim 10, further comprising:
 a graphics processing unit configured to generate the source data.

17. The computer system of claim 10, wherein the compression engine is further configured to generate a type variable that identifies a compression algorithm used to form the compressed data and to transmit the type variable to the metadata processor.

18. The computer system of claim 10, wherein the compression engine is further configured to generate a position variable that identifies a desired position of the compressed data within a compressed data buffer in the memory and to transmit the position variable to the metadata processor.

19. The computer system of claim 18, wherein the compressed data buffer has a same size as the source data.

20. A non-transitory computer-readable medium including instructions that when executed by a computing system cause the computing system to:

compress source data in a compression engine according to a compression ratio to form compressed data;

process the compressed data to form metadata, wherein the metadata has a size smaller than a burst length of a memory;

generate autofill data responsive to the compression ratio;

concatenate the metadata and the autofill data to form a metadata burst having a same size as the burst length; and write the metadata burst to the memory.

* * * * *